United States Patent
Pfeilschifter

(10) Patent No.: US 12,325,314 B2
(45) Date of Patent: Jun. 10, 2025

(54) VEHICLE ON-BOARD ELECTRICAL SYSTEM

(71) Applicant: Vitesco Technologies GmbH, Regensburg (DE)

(72) Inventor: Franz Pfeilschifter, Munich (DE)

(73) Assignee: Vitesco Technologies GmbH, Regensburg (DE)

(*) Notice: Subject to any disclaimer, the term of this patent is extended or adjusted under 35 U.S.C. 154(b) by 146 days.

(21) Appl. No.: 17/768,727

(22) PCT Filed: Oct. 7, 2020

(86) PCT No.: PCT/EP2020/078114
§ 371 (c)(1),
(2) Date: Apr. 13, 2022

(87) PCT Pub. No.: WO2021/073977
PCT Pub. Date: Apr. 22, 2021

(65) Prior Publication Data
US 2024/0140225 A1   May 2, 2024

(30) Foreign Application Priority Data

Oct. 15, 2019   (DE) .................. 10 2019 007 350.9
Oct. 15, 2019   (DE) .................. 10 2019 215 855.2

(51) Int. Cl.
*B60L 53/22* (2019.01)
*B60L 15/22* (2006.01)
*B60L 53/10* (2019.01)

(52) U.S. Cl.
CPC .............. *B60L 53/22* (2019.02); *B60L 15/22* (2013.01); *B60L 53/11* (2019.02); *B60L 2210/10* (2013.01)

(58) Field of Classification Search
CPC .......... B60L 53/22; B60L 15/22; B60L 53/11; B60L 2210/10; B60L 15/007; B60L 3/04;
(Continued)

(56) References Cited

U.S. PATENT DOCUMENTS

| 9,331,504 B2 | 5/2016 | Butzmann |
| 9,774,215 B2 | 9/2017 | Mizuno |

(Continued)

FOREIGN PATENT DOCUMENTS

| CN | 1298818 A | 6/2001 |
| CN | 103250321 A | 8/2013 |

(Continued)

OTHER PUBLICATIONS

Office Action (The Second Office Action) issued Aug. 29, 2024, by the National Intellectual Property Administration, P. R. China in corresponding Chinese Patent Application No. 202080072112.1 and an English/German translation of the Office Action. (23 pages).

(Continued)

*Primary Examiner* — Paul Dinh
(74) *Attorney, Agent, or Firm* — Buchanan Ingersoll & Rooney PC

(57) ABSTRACT

A vehicle electrical system is equipped with a DC charging connection, a rechargeable battery, a DC-DC converter and an electric drive. The DC-DC converter has a first side that is connected to a connecting point via a first switching device. The DC-DC converter has a second side to which the electric drive is connected and which is connected via a second switching device and to the connecting point. The connecting point is connected to the rechargeable battery. The DC charging connection is connected to one side of the first switching device that is connected to the first side of the DC-DC converter.

10 Claims, 1 Drawing Sheet

(58) Field of Classification Search
CPC . B60L 3/00; B60L 50/60; Y02T 10/64; Y02T 10/70; Y02T 10/7072; Y02T 10/72; Y02T 90/14; B60R 16/033; B60Y 2200/91
USPC .......................................................... 320/109
See application file for complete search history.

(56) References Cited

U.S. PATENT DOCUMENTS

| | | | |
|---|---|---|---|
| 10,283,990 | B2 | 5/2019 | Fuchs et al. |
| 10,763,690 | B2 | 9/2020 | Pefilschifter et al. |
| 10,919,467 | B2 | 2/2021 | Link et al. |
| 11,021,065 | B2 | 6/2021 | Waag et al. |
| 11,097,626 | B2 | 8/2021 | Pefilschifter et al. |
| 11,104,232 | B2 | 8/2021 | Mittnacht et al. |
| 11,207,993 | B2 | 12/2021 | Pfeilschifter et al. |
| 2013/0234675 | A1 | 9/2013 | King et al. |
| 2014/0159478 | A1* | 6/2014 | Ang ................ B60L 1/003 307/9.1 |
| 2015/0298631 | A1* | 10/2015 | Belger ............. B60L 53/14 307/10.1 |
| 2016/0089998 | A1 | 3/2016 | Thömmes |
| 2017/0267105 | A1* | 9/2017 | Fratelli ............. B60L 15/20 |
| 2018/0138730 | A1 | 5/2018 | Fuchs et al. |
| 2018/0215278 | A1 | 8/2018 | Yabuuchi |
| 2018/0281602 | A1 | 10/2018 | Strasser |
| 2019/0176729 | A1* | 6/2019 | Link ................ B60L 58/22 |
| 2019/0210475 | A1 | 7/2019 | Pfeilschifter et al. |
| 2020/0282848 | A1* | 9/2020 | Suzuki ............ H01M 8/04701 |
| 2022/0231537 | A1 | 7/2022 | Hirota et al. |

FOREIGN PATENT DOCUMENTS

| | | |
|---|---|---|
| CN | 105915092 A | 8/2016 |
| CN | 107592954 A | 1/2018 |
| CN | 107733055 A | 2/2018 |
| CN | 109414997 A | 3/2019 |
| DE | 102006001764 A1 | 3/2007 |
| DE | 102014009088 A1 | 11/2014 |
| DE | 102014218817 A1 | 3/2016 |
| DE | 102016207378 A1 | 11/2017 |
| DE | 102016213072 A1 | 1/2018 |
| DE | 102016122008 A1 | 5/2018 |
| DE | 102017213682 A1 | 2/2019 |
| DE | 102018006810 A1 | 2/2019 |
| DE | 10 2017 222 554 A1 | 6/2019 |
| DE | 102017222192 A1 | 6/2019 |
| EP | 2672600 A2 | 12/2013 |
| KR | 20190001927 A | 1/2019 |
| WO | 2019170730 A1 | 9/2019 |

OTHER PUBLICATIONS

Notice of Allowance issued by the U.S. Patent and Trademark Office in the U.S. Appl. No. 17/768,338, mailed Oct. 8, 2024, U.S. Patent and Trademark Office, Alexandria, VA. (5 pages).
International Search Report and Written Opinion for International Application No. PCT/EP2020/078114, mailed Jan. 20, 2021, 9 pages.
International Search Report and Written Opinion for International Application No. PCT/EP2020/078114, mailed Jan. 20, 2021, 14 pages (German).
German Examination Report for German Application No. 10 2019 215 855.2, dated Jun. 10, 2020, with translation, 11 pages.
International Search Report and Written Opinion for International Application No. PCT/EP2020/078142, dated Jan. 22, 2021, 7 pages.
International Search Report and Written Opinion for International Application No. PCT/EP2020/078142, dated Jan. 22, 2021, 12 pages (German).
German Decision to Grant a Patent for German Application No. 10 2019 007 347.9, dated Sep. 8, 2021 with partial translation, 9 pages.
Office Action (The First Office Action) issued Dec. 21, 2023, by the State Intellectual Property Office of People's Republic of China in corresponding Chinese Patent Application No. 202080072112.1 and an English translation of the Office Action. (23 pages).
Office Action (First Office Action) issued Dec. 22, 2023, by the State Intellectual Property Office of People's Republic of China in Chinese Patent Application No. 202080073751.X and an English translation of the Office Action. (22 pages).
Office Action (Notice to Submit Response) issued Jan. 24, 2024, by the Korean Intellectual Property Office in Korean Patent Application No. 10-2022-7015614 and an English translation of the Office Action. (9 pages).
Korean Notice to Submit Response for Korean Application No. 10-2022-7015613, dated Oct. 30, 2023 with translation, 14 pages.
Office Action (Notice of Allowance) issued Jul. 20, 2024 by the Korean Intellectual Property Office in Korean Patent Application No. 10-2022-7015613 and an English translation of the Office Action. (4 pages).
Office Action issued by the U.S. Patent and Trademark Office in the U.S. Appl. No. 17/768,338 mailed Sep. 16, 2024, U.S. Patent and Trademark Office, Alexandria, VA. (26 pages).
Notice of Allowance issued Sep. 30, 2024, by the Korean Intellectual Property Office in corresponding Korean Patent Application No. 10-2022-7015614 and an English translation of the Notice of Allowance. (3 pages).

* cited by examiner

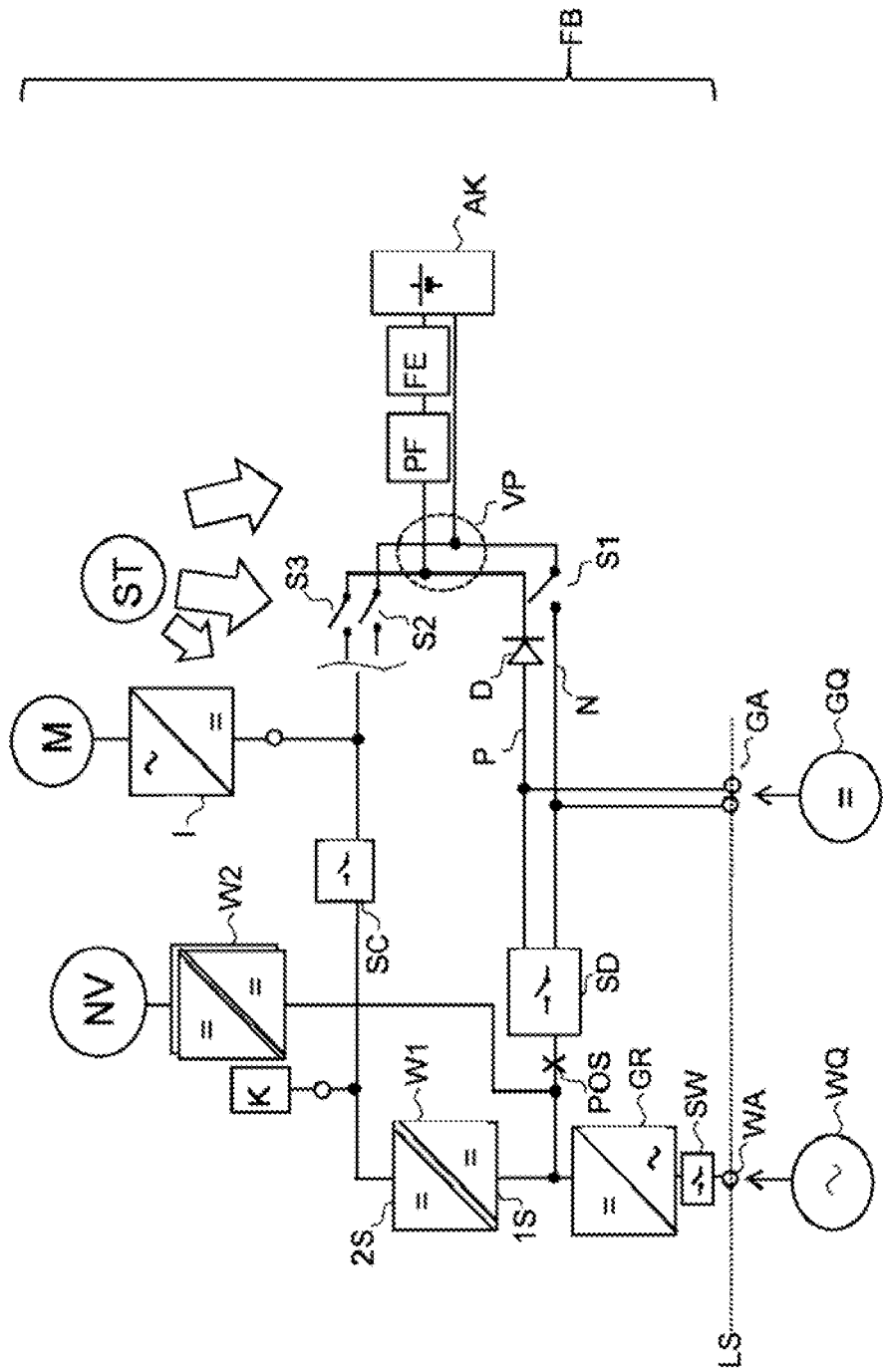

VEHICLE ON-BOARD ELECTRICAL SYSTEM

CROSS REFERENCE TO RELATED APPLICATIONS

This application is the U.S. National Phase Application of PCT International Application No. PCT/EP2020/078114, filed Oct. 7, 2020, which claims priority to German Patent Application No. 10 2019 215 855.2, filed Oct. 15, 2019, and German Patent Application No. 10 2019 007 350.9, filed Oct. 15, 2019, the contents of such applications being incorporated by reference herein.

BACKGROUND OF THE INVENTION

Vehicles with an electric drive have a rechargeable battery, which, in the case of plug-in vehicles, can be charged from the outside by means of a charging connection. Furthermore, there are components within the vehicle with a nominal voltage of, for example, 800 volts (such as the high-voltage rechargeable battery), while a different voltage of 400 volts can be provided at the charging input depending on the charging station. There are therefore several sections within the electrical system that have different nominal voltages but are connected directly or indirectly to the rechargeable battery.

Vehicles with an electric drive have a rechargeable battery, which, in the case of plug-in vehicles, can be charged from the outside by means of a charging connection. Furthermore, there are components within the vehicle with a nominal voltage of, for example, 800 volts (such as the high-voltage rechargeable battery), while a different voltage of 400 volts can be provided at the charging input depending on the charging station. There are therefore several sections within the electrical system that have different nominal voltages but are connected directly or indirectly to the rechargeable battery.

SUMMARY OF THE INVENTION

It is also an aspect of the invention to show a possibility with which a vehicle electrical system can be designed in such a way that, on the one hand, different nominal voltages within the vehicle electrical system are possible and, on the other hand, the vehicle can be charged and driven in a manner protected against excessive contact voltages despite the different nominal voltages in sections of the vehicle electrical system.

Further embodiments, features, properties and advantages emerge from the dependent claims, the description and the FIGURE.

A vehicle electrical system having a DC charging connection, a rechargeable battery, a DC-DC converter and an electric drive is proposed. The DC-DC converter has a first side and a second side, wherein the first side is connected to a connecting point via a first switching device. A second side of the DC-DC converter is connected to the electric drive and is also connected to the connecting point via a second switching device. The connecting point is used to couple the rechargeable battery. The rechargeable battery is connected to the connecting point (in particular via a disconnecting device and/or via a fuse). The DC charging connection is connected to one side of the switching device, wherein said side is connected to the first side of the DC-DC converter. The DC charging connection is thus connected to the first side of the DC-DC converter and in particular (in relation thereto) on this side of the switching device. In other words, the DC charging connection is connected to the connecting point and thus to the rechargeable battery via the first switching device. Starting from the rechargeable battery, there are thus two different paths that are brought together by the connecting point, with the different paths leading to the different sides of the DC-DC converter. One of the two switching devices is provided in each path.

As a result, the DC charging connection can be disconnected from the rechargeable battery by means of the switching device. The electric drive can also be disconnected from the rechargeable battery by means of a switching device (namely the second switching device). Both for driving and for charging, there are thus possibilities of disconnecting the rechargeable battery in order to be able to avoid high contact voltages. In particular, the procedure allows a high voltage stored in the electric drive (such as the voltage of the intermediate circuit) to be isolated by means of the switching devices in order to be able to avoid high contact voltages in this way.

The first switching device has two poles and comprises a diode device for one potential of the vehicle electrical system and a switching element for the other potential of the vehicle electrical system. Both the diode device and the switching element are connected in series and enable the flow of current to be interrupted. The switching element is in particular an electromechanical switching element or else a semiconductor switch. The first switching device connects two potentials of the first side of the DC-DC converter to two potentials of the connecting point. The two potentials are, for example, a negative potential and a positive potential or a positive potential and a ground potential. The switching device provides a switching element for one of the potentials. The switching device provides a diode device for the other potential. As mentioned, these are connected in series. The forward direction of the diode device preferably corresponds to the direction of current flow of a charging current by means of which electrical energy is conducted from the DC charging connection to the rechargeable battery. If the diode device is at the positive potential, then the forward direction leads from the DC charging connection to the connecting point or to the rechargeable battery. If the diode device is at the negative potential or the ground potential, then the forward direction points away from the connecting point or from the rechargeable battery and toward the DC charging connection. The potentials are in each case DC voltage potentials. A DC voltage is applied between the potentials. In particular, each potential corresponds in each case to a (DC) busbar, which can also be referred to as a DC busbar or DC conductor. The potentials are in particular DC voltage potentials. A supply voltage is applied between the potentials, in particular a high-voltage supply voltage. The potentials are in particular high-voltage potentials.

The diode device is preferably a power diode device. The diode device has the function of the diode, but does not necessarily have to be realized by a single diode; instead it may have further diodes or may have other components that realize the diode function.

The diode device preferably connects a positive potential of the first side of the DC-DC converter to a potential of the connecting point (or of the rechargeable battery). The forward direction of the diode device points from the first side of the DC-DC converter toward the connecting point. Alternatively, the diode device connects a negative potential of the first side of the DC-DC converter to a negative potential of the connecting point (or of the rechargeable battery). In this case, the forward direction of the diode device points from the connecting point (or from the rechargeable battery) to the first side of the DC-DC converter.

The diode device is preferably a semiconductor device. The diode device may correspond to a diode. Furthermore, the diode device can have at least one diode. If the diode device has a plurality of diodes, these can be connected to one another in parallel or in series, but they preferably all have the same forward direction. The diode of the diode device is connected in series. Alternatively, the diode device has a transistor or another semiconductor element, wherein the transistor or the semiconductor element is actuated by way of its wiring such that it performs the function of a diode. This applies in particular to components that can be controlled by external switching signals, with these realizing the function of a diode through appropriate actuation and/or wiring. These are also considered to be a diode device.

The second switching device connects two potentials of the second side of the DC-DC converter to two potentials of the connecting point. In this case, the switching device connects a first potential of the second side to a first potential of the connecting point by means of a first switchable connection and the second potential of the second side to the second potential of the connecting point by means of a second switchable connection. The second switching device thus connects the potentials individually in each case. The switching device has a switching element for each potential. The switching element can be designed as an electromechanical switching element or as a semiconductor switching element, such as a transistor. In particular, the two switching elements are formed by the contacts of a double relay.

Provision can also be made for the connecting point to be connected to the rechargeable battery via a pyrofuse. A pyrofuse is an electrical connection that can be opened using an explosive. The explosive is triggered by an electric igniter. When triggered, the explosive mechanically disconnects an electrical connection. The pyrofuse is preferably connected in series at the same potential as the diode device.

A controller in the sense of a control device can be provided, which is set up to actuate the switching devices according to an open state or to open said switching devices. The controller is also set up to trigger the pyrofuse only if at least one of the switching devices does not open despite appropriate actuation or if a high potential or high voltage is still detected despite appropriate actuation. For this purpose, the controller is connected to the switching devices and the pyrofuse in an actuating manner. In particular, the controller is set up to first activate the switching devices and then, after checking the effect of the opening of the switching devices, to trigger the pyrofuse if, despite opening, a high potential (on a side of the pyrofuse facing away from the rechargeable battery) can be detected.

The connecting point can be connected to the rechargeable battery via a disconnecting device. During maintenance, for example, the disconnecting device can be used to disconnect the sections of the vehicle electrical system from the power supply. The disconnecting device is connected in series at the same potential as the diode device. In particular, the disconnecting device is at the same potential (or in the same busbar) as the pyrofuse. The disconnecting device can be present between the pyrofuse and the rechargeable battery. Furthermore, the pyrofuse can be present between the disconnecting device and the rechargeable battery. Both the pyrofuse and the disconnecting device, if present, are preferably only provided at one of the two potentials (in particular at the potential at which the diode device also is), while the other potential is transferred by a direct connection between the connecting point and the rechargeable battery.

The disconnecting device may be a circuit breaker with an isolating function, a power circuit breaker, a fuse, a switch disconnector, a residual current circuit breaker or a plug-in device. The disconnecting device is preferably a removable jumper. If said jumper is removed from a holder, then two contacts are disconnected from each other, while the two contacts are connected to each other by the jumper when the jumper is plugged in.

The second switching device is preferably designed as a double relay.

An AC charging connection can also be provided, which is connected to the first side of the DC-DC converter via a rectifier. A further switching device can be provided, which is provided between the first side of the DC-DC converter and the first switching device. The DC charging connection can be connected directly to the first switching device, or it can be connected to the first switching device via the further switching device. The DC charging connection can be connected directly to the first switching device and/or it can be connected directly to the first side of the DC-DC converter.

Another DC-DC converter (hereinafter: additional converter) can be provided. Said additional converter can have a first side, which is connected to the first side of the DC-DC converter. A second side of the additional converter can be connected to a low-voltage electrical system, such as an electrical system section that has an end voltage of approximately 12, 13, 14, 24 or 48 volts.

Additional electrical components can be provided, which are connected to the second side of the DC-DC converter. This may involve, for example, a heating device, in particular an electrical heating device of a catalytic converter, or an air-conditioning device such as an electrical air conditioning-compressor or an electrical interior heating element, for example. A further switch can be provided between the second side of the DC-DC converter and the electric drive. The other components can be connected directly to the second side, while the electric drive is connected to the second side via this switch. This switch can be designed as a semiconductor fuse, in particular as an IGBT, with which a diode is connected in parallel. In the event of a fault, the semiconductor fuse is opened by a control signal. The forward direction of the diode preferably points from the second side of the DC-DC converter to the second switching device. This is especially true when the switch is provided at the positive potential; if said switch is connected in series at a negative potential, the diode has the reverse flow direction.

The rechargeable battery and the disconnecting device, the rechargeable battery and the pyrofuse or the rechargeable battery, the disconnecting device and the pyrofuse can be provided in one housing, while the remaining components of the vehicle electrical system are provided in at least one other housing.

The vehicle electrical system is preferably a high-voltage electrical system with a nominal voltage of at least 60 volts, 100 volts, 200 volts, 400 volts or 800 volts (at least in sections). The rechargeable battery is preferably a rechargeable traction battery, in particular a high-voltage rechargeable battery. The rechargeable battery can be a rechargeable lithium battery. The rechargeable battery has a nominal voltage of 400 volts or 800 volts, for example. The rectifier between the AC charging connection and the first side of the DC-DC converter can be an uncontrolled rectifier, a controlled rectifier, or a power factor correction filter. In addition, a further voltage converter may be provided between the rectifier and the DC-DC converter. A filter may be provided between the first side of the DC-DC converter and the first switching device.

BRIEF DESCRIPTION OF THE DRAWINGS

The FIGURE is used to explain embodiments of the vehicle electrical system described here.

DETAILED DESCRIPTION OF THE PREFERRED EMBODIMENTS

The FIGURE shows a vehicle electrical system FB having a DC charging connection GA, a rechargeable battery AK, a DC-DC converter W1 and an electric drive, which comprises the inverter I and the electric machine M. The rechargeable battery has a negative pole which is connected directly to a connecting point or to a corresponding negative potential N of the connecting point VP. The positive pole of the rechargeable battery AK is connected to a positive potential P of the connecting point VP via a disconnecting device FE and a pyrofuse PF. Two paths branch off from the connecting point VP.

A first path, which branches off from the connecting point VP, leads from the connecting point VP via a first switching device (comprising switch S1 in the negative current path and the diode D in the positive current path) and via a switch SD (all-pole, that is to say in the negative and in the positive current path) to a first side 1S of the DC-DC converter W1. In this case, a DC charging connection GA is connected to the connecting point VP via the switching device S1, D. The switch SD is connected in series with the first switching device.

A second path, which leads away from the connecting point VP, leads via the second (all-pole) switching device S2, S3 and an (all-pole) additional switch SC to the at least one component K, W2, NV and, consequently to a second side 2S of the DC-DC converter W1. The paths that branch off from the connecting point VP are brought together at the DC-DC converter W1.

An optional AC charging connection WA is connected via a disconnector switch SW to a rectifier GR, which in turn is connected to the first side 1S of the DC-DC converter W1. The rectifier GR is connected directly to the first side 1S of the DC-DC converter W1. The additional switch SD connects the first side of the DC-DC converter and thus also the DC side of the rectifier GR to the first switching device S1, D on the one hand and to the DC charging connection GA on the other. An alternative position POS is shown, at which the DC charging connection GA is connected in an alternative embodiment. Said position is located between the switch SD and the first side 1S of the DC-DC converter W1. In the example shown, however, the DC charging connection GA and the AC charging connection WA or its rectifier GR are on different sides of the switch SD.

The second side 2S of the DC-DC converter W1 is connected directly to a component K, shown as an example. An additional switch SC connects this component and thus also the second side 2S of the converter W1 to the second switching device S2, S3. The electric drive and in particular its inverter I is connected to the side of the additional switch ST that is connected to the second switching device S2, S3. The component K (for example an 800 volt component such as an electric heater or an air-conditioning compressor) is connected on the side of the additional switch SC which is connected to the second side 2S of the DC-DC converter W1. The switch denoted by SC can have the function of a semiconductor fuse, that is to say the function of a semiconductor-based disconnector switch which opens in the event of an overcurrent.

The first switching device comprises the first switch S1 and the diode D. The first switch S1 is provided at the negative potential N, while the diode D is provided in series connection at the positive potential. The diode D thus connects the positive potential of the DC connection to the positive potential of the connecting point or of the rechargeable battery. The first switch S1 connects the negative potential of the DC connection GA to the negative potential of the connecting point VP or of the rechargeable battery AK.

The second switching device comprises a second switch S2 and a third switch S3, the third switch S2 being provided at the negative potential (connected in series) and the third switch being provided at the positive potential. In other words, the switch S1 and the switch S2 are located in the negative busbar of the vehicle electrical system. The diode D is located in the positive busbar of the connecting electrical system. This also applies to the third switch S3. In contrast to the two-pole switch unit, which is formed by the switches S2, S3, the first switching device comprises, in addition to the switching element S1 (first switch), the diode D, that is to say a component with a reverse direction and a forward direction, in which the current flow is specified by the direction of the current, not by an external control signal.

The two voltage rails or potentials N, P are shown individually on the right-hand side of the vehicle electrical system shown. Viewed from the rechargeable battery, beyond the second switching device or beyond the switch SD, only the basic connections but not the individual potentials are shown for the sake of simplicity. Even if the connection is thus only represented by a single line on the left-hand side of the FIGURE, the connections comprise a positive and a negative busbar or two potentials (a positive and a negative potential P, N).

A controller ST is connected to the switches S1, S2 and S3 in an actuating manner and can also be connected to the switches SC and SD, possibly also to the switch SW, in an actuating manner. This actuating connection is represented symbolically by the double arrow.

The controller ST is also connected to the pyrofuse in an actuating manner in order to trigger it if necessary. The controller ST is set up to first open the switches S1, S2 and S3 and possibly also the switches SD, SC and SW then only to trigger the pyrofuse if a high voltage can be detected, for example, at the DC charging connection GA or at the AC charging connection WA or at another point within the vehicle electrical system, although no high voltage would be expected there according to the switch actuation. In the event of a fault, the controller opens the corresponding switches or fuses.

The vehicle electrical system comprises the connections WA and GA for charging, these forming the charging interface LS. External voltage sources WQ and GQ are set up to be connected to these connections WA, GA and can be provided as an external energy source by a charging station, for example.

The invention claimed is:

1. A vehicle electrical system comprising:
a DC charging connection;
a rechargeable battery;
a DC-DC converter; and
an electric drive,
wherein the DC-DC converter has a first side that is connected to a connecting point via a first switching device and the DC-DC converter has a second side to which the electric drive is connected and that is connected via a second switching device and to the connecting point, and wherein the connecting point is connected to the rechargeable battery and the DC charging connection is connected to one side of the first switching device that is connected to the first side of the DC-DC converter, wherein the first switching device connects two potentials of the first side of the DC-DC converter to two potentials of the connecting point, and wherein the first switching device provides a switching element for one of the potentials and provides a diode device for the other potential, a forward direction of said diode device corresponding to a direction of current flow of a charging current by which electrical energy is conducted from the DC charging connection to the rechargeable battery.

2. The vehicle electrical system as claimed in claim 1, wherein the diode device connects a positive potential of the first side of the DC-DC converter to a positive potential of the connecting point and the forward direction of the diode device is directed from the first side of the DC-DC converter toward the connecting point, or wherein the diode device connects a negative potential of the first side of the DC-DC converter to a negative potential of the connecting point and the forward direction of the diode device is directed from the connecting point toward the first side of the DC-DC converter.

3. The vehicle electrical system as claimed in claim 1, wherein the diode device corresponds to a diode that is connected in series or comprises a transistor that is actuated by way of its wiring such that it performs the function of a diode.

4. The vehicle electrical system as claimed in claim 1, wherein the second switching device connects two potentials of the second side of the DC-DC converter to two potentials of the connecting point, wherein the second switching device provides a switching element for each potential.

5. The vehicle electrical system as claimed in claim 1, wherein the connecting point is connected to the rechargeable battery via a pyrofuse, wherein the pyrofuse is connected in series at the same potential as the diode device.

6. The vehicle electrical system as claimed in claim 5, which further comprises a controller, which is set up to actuate the switching devices according to an open state and is also set up to trigger the pyrofuse only if at least one of the switching devices does not open despite appropriate actuation.

7. The vehicle electrical system as claimed in claim 1, wherein the connecting point is connected to the rechargeable battery via a disconnecting device, wherein the disconnecting device is connected in series at the same potential as the diode device.

8. The vehicle electrical system as claimed in claim 7, wherein the disconnecting device is a power circuit breaker with an isolating function, a circuit breaker, a fuse, a switch disconnector, a residual current circuit-breaker or a plug-in device.

9. The vehicle electrical system as claimed in claim 8, wherein the plug-in device is a removable jumper.

10. The vehicle electrical system as claimed claim 1, wherein the second switching device is designed as a double relay.

* * * * *

UNITED STATES PATENT AND TRADEMARK OFFICE
CERTIFICATE OF CORRECTION

PATENT NO. : 12,325,314 B2  
APPLICATION NO. : 17/768727  
DATED : June 10, 2025  
INVENTOR(S) : Franz Pfeilschifter Page 1 of 1

It is certified that error appears in the above-identified patent and that said Letters Patent is hereby corrected as shown below:

In the Claims

In Column 8, Line 30 in Claim 10, the phrase "claimed claim 1," should read -- claimed in claim 1, --.

Signed and Sealed this  
Thirtieth Day of September, 2025

John A. Squires  
*Director of the United States Patent and Trademark Office*